United States Patent [19]

Washo

[11] Patent Number: 5,416,754
[45] Date of Patent: May 16, 1995

[54] MAGNETO-OPTICAL RECORD MEDIUM HAVING RECORD/NON-RECORD AREAS AND A MAGNETO-OPTICAL RECORD/REPRODUCE APPARATUS USING THE SAME

[75] Inventor: Junichi Washo, Ikoma, Japan

[73] Assignee: Sharp Kabushiki Kaisha, Osaka, Japan

[21] Appl. No.: 995,367

[22] Filed: Dec. 23, 1992

[30] Foreign Application Priority Data

Dec. 26, 1991 [JP] Japan .................... 3-344267

[51] Int. Cl.$^6$ ............................. G11B 13/04
[52] U.S. Cl. ........................ 369/13; 369/280
[58] Field of Search .......... 369/13, 14, 54, 58, 369/275.1, 275.2, 275.3, 275.4, 275.5, 283, 284, 282, 280, 286, 288; 360/59, 114, 66, 103, 109; 428/694, 900; 365/122; 427/127, 130, 131

[56] References Cited

U.S. PATENT DOCUMENTS 5,128,922 7/1992 Inui et al. ...................... 369/280
5,191,563 3/1993 Lee et al. ....................... 369/13

*Primary Examiner*—Georgia Y. Epps
*Assistant Examiner*—Tan Dinh
*Attorney, Agent, or Firm*—David G. Conlin; Kevin J. Fournier

[57] ABSTRACT

A magneto-optical record/reproduce apparatus utilizes a magneto-optical record medium having a surface on which a record area and a non-record area are defined, the non-record area having a lower friction than that of the record area. The apparatus includes a record/read head disposed in the vicinity of the surface of the magneto-optical record medium, the record/read head being moved away from the magneto-optical record medium during a running state of the magneto-optical record medium for recording or reading information, the record/read head being in contact with the magneto-optical record medium during a stop state of the magneto-optical record medium after terminating the recording or reading of the information, a termination detect section for detecting a termination of the recording/reading of the information related to the magneto-optical record medium, and for outputting a termination detect signal, and a move device for moving the record/read head to a position facing the non-record area based on the termination detect signal from the termination detect section.

3 Claims, 3 Drawing Sheets

FIG. 5 PRIOR ART
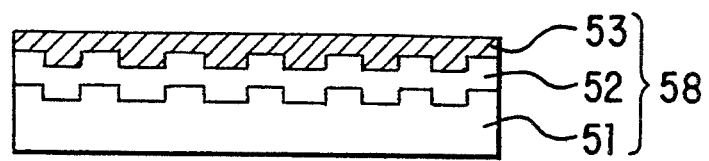
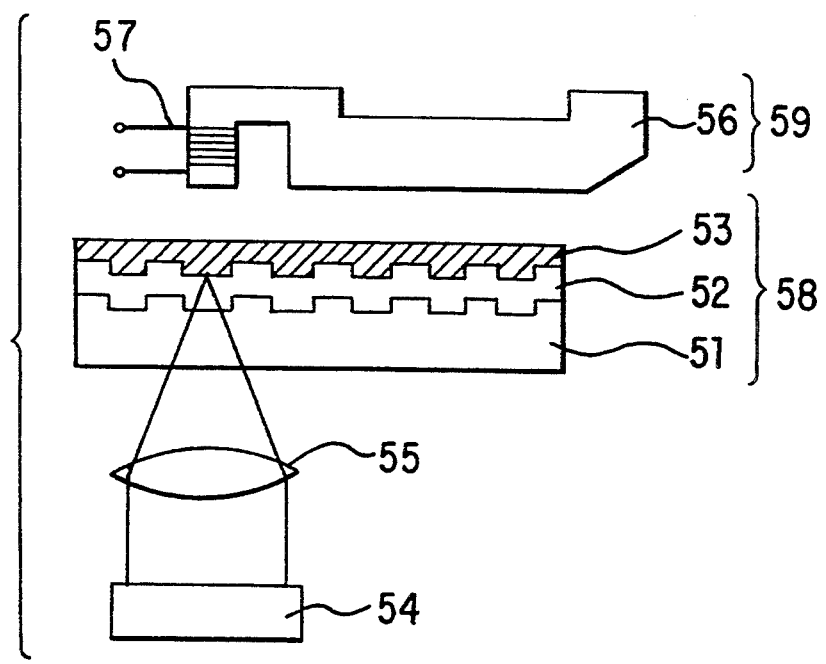
FIG. 6 PRIOR ART

//5,416,754//

MAGNETO-OPTICAL RECORD MEDIUM HAVING RECORD/NON-RECORD AREAS AND A MAGNETO-OPTICAL RECORD/REPRODUCE APPARATUS USING THE SAME

BACKGROUND OF THE INVENTION

1. Field of the Invention

The present invention relates to a magneto-optical record medium on which information such as document files, images or code data are recorded in high density or from which such information are reproduced, and a magneto-optical record/reproduce apparatus using the magneto-optical record medium.

2. Description of the Related Art

A conventional magneto-optical record disk (hereinafter, referred to in short as a record disk) 58 has a structure shown in FIG. 5 and is formed in the following manner. First, part of a plastic substrate 51 is molded using a molding apparatus so as to have a convex and concave pattern corresponding to a desired information signal. On a convex and concave portion where the above convex and concave pattern is formed, a record layer 52 and a protective layer 53 are successively laminated, thereby constructing the record disk 58.

In a magneto-optical record/reproduce apparatus using the record disk 58, a levitated-type magnetic head is sometimes used in order to shorten the access time for accessing information. In the magneto-optical record/reproduce apparatus using such a levitated-type magnetic head, information can be overwritten by modulating a magnetic field. By using the levitated-type magnetic head, it is possible to shorten the time required for inverting the magnetic field in a record/reproduce operation. Such a magneto-optical record/reproduce apparatus is shown in FIG. 6. A conventional magneto-optical record/reproduce apparatus includes a magnetic head 59. The magnetic head 59 is positioned above the record disk 58 during the record/reproduce operation of the apparatus. The magnetic head 59 includes a slider 56 with a magnet coil 57. An optical pickup is provided on the opposite side of the record disk 58. The optical pickup includes a semiconductor laser device 54 and a convergent lens 55.

In the above-mentioned magneto-optical record/reproduce apparatus, a distance between the protective layer 53 of the record disk 58 and the levitated-type magnetic head 59 is 2 to 5 $\mu$m, which means that they are positioned extremely close to each other. The distance therebetween is determined for the following reasons. Information are recorded on the record disk 58 in high density, so that a record frequency used for recording information on the record disk 58 is several megahertz. The levitated-type magnetic head 59 is required to invert the magnetic field in a synchronous manner with a record signal having the above record frequency.

In the above-mentioned magneto-optical record/reproduce apparatus of the magnetic field modulation overwriting type, during the rotation of the record disk 58, an air flow occurs between the record disk 58 and the magnetic head 59. During the rotation of the record disk 58, the magnetic head 59 is levitated from the record disk 58 due to the lift caused by the air flow, so that the distance between the magnetic head 59 and the record disk 58 is maintained constant. On the other hand, when the rotation of the record disk 58 is to be stopped, the magnetic head 59 goes down toward the record disk 58 and comes into contact with the protective layer 53 of the record disk 58. At the start and the end of the rotation of the record disk 58, the record disk 58 rotates while the magnetic head 59 is in contact with the record disk 58. Especially when the record disk 58 is to be stopped, the magnetic head 59 is closely in contact with the protective layer 53.

Therefore, at the start of the rotation of the record disk 58, the probability that the magnetic head 59 is damaged is high, and if damaged, the damage is serious. Thus, there arise such problems that the magnetic head 59 erroneously operates during the record/read operation, and that the life time of the magnetic head 59 is shortened. In some cases, the surface of the protective layer 53 of the record disk 58 may have scratches or an undesired convex and concave pattern, which causes such problems that a noise is mixed in the record/reproduce operation and that the life time of the record disk 58 is shortened.

SUMMARY OF THE INVENTION

The magneto-optical record medium of this invention has a surface on which a record area and a non-record area are defined. The non-record area has a lower friction than that of the record area.

According to another aspect of the present invention, a magneto-optical record/reproduce apparatus is provided. The magneto-optical record/reproduce apparatus utilizes a magneto-optical record medium having a surface on which a record area and a non-record area are defined, the non-record area having a lower friction than that of the record area. The apparatus includes: record/read means disposed in the vicinity of the surface of the magneto-optical record medium, the record/read means being moved away from the magneto-optical record medium during a running state of the magneto-optical record medium for recording or reading information, the record/read means being in contact with the magneto-optical record medium during a stop state of the magneto-optical record medium after terminating the recording or reading of the information; termination detect means for detecting a termination of the record/read of the information related to the magneto-optical record medium, and for outputting a termination detect signal; and move means for moving the record/read means to a position facing the non-record area based on the termination detect signal from the termination detect means.

According to the present invention, the magneto-optical record medium starts to run when information is recorded on the magneto-optical record medium or when the information is read from the magneto-optical record medium. When the recording or the reading of information is terminated, the running of the magneto-optical record medium is stopped. In the stop state of the magneto-optical record medium, the record/read means is in contact with the non-record area which has a lower friction than that of the record area of the magneto-optical record medium. When information is to be recorded/read, the magneto-optical record medium starts to run from a state where the record/read means is in contact with the non-record area. At this time, since the non-record area has the lower friction than that of the record area, the friction between the magneto-optical record medium and the record/read means can be reduced.

Therefore, it is possible to prevent the record/read means and the magneto-optical record medium from being damaged, and hence to prevent the record/read means from erroneously operating in the record/read operation. The life time of the record/read means can also be extended. Moreover, it is possible to prevent the surface of the magneto-optical record medium from being damaged, and hence to prevent any noise from mixing during the recording or reading of information. The life time of the magneto-optical record medium can also be extended.

When the recording/reading of information is finished, the termination detect means detects the termination and outputs a termination detect signal. The move means moves the record/read means to the non-record area of the magneto-optical record disk. Therefore, the record area of the magneto-optical record disk is prevented from being damaged, and a noise mixture due to the damage can be prevented. Since the non-record area has a lower friction than that of the record area, it is possible to prevent the magneto-optical record medium and the record/read means from being damaged, even when the record/read means comes into contact with the non-record area during the running of the magneto-optical record medium.

Thus, the invention described herein makes possible the advantages of (1) providing a magneto-optical record medium in which a noise is prevented from mixing into information to be recorded or reproduced, so that the quality of the information can be improved and the life time can be extended, and (2) providing a magneto-optical record/reproduce apparatus in which the surface of the magneto-optical record medium and the record/read means are prevented from being damaged, the life time of the magneto-optical record medium and the life time of the record/read means can be both extended, and the operation quality of the record/read operation can be improved.

These and other advantages of the present invention will become apparent to those skilled in the art upon reading and understanding the following detailed description with reference to the accompanying figures.

BRIEF DESCRIPTION OF THE DRAWINGS

FIGS. 4A, 4B-1, 4B-2 through 4E are sectional views illustrating a manufacturing method of the record disk 8 in the example according to the present invention.

FIG. 5 is a sectional view showing the structure of a conventional record disk.

FIG. 6 is a sectional view showing the structure of a conventional magneto-optical record/reproduce apparatus.

DESCRIPTION OF THE PREFERRED EMBODIMENTS

Figure 1:
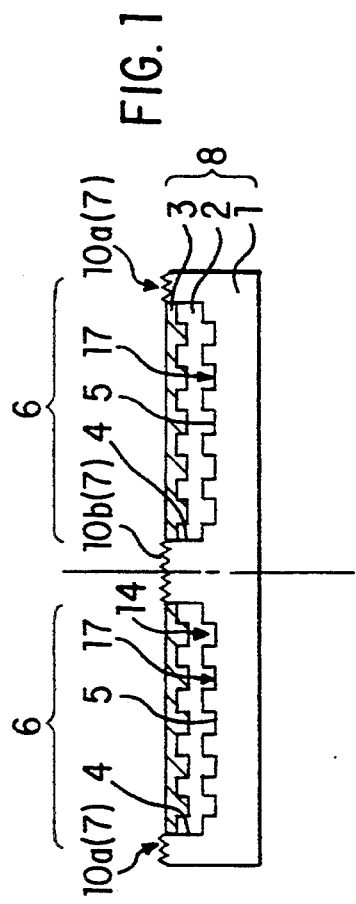
FIG. 1 is a sectional view showing a structure of a record disk 8 according to an example of the present invention.
Figure 2:
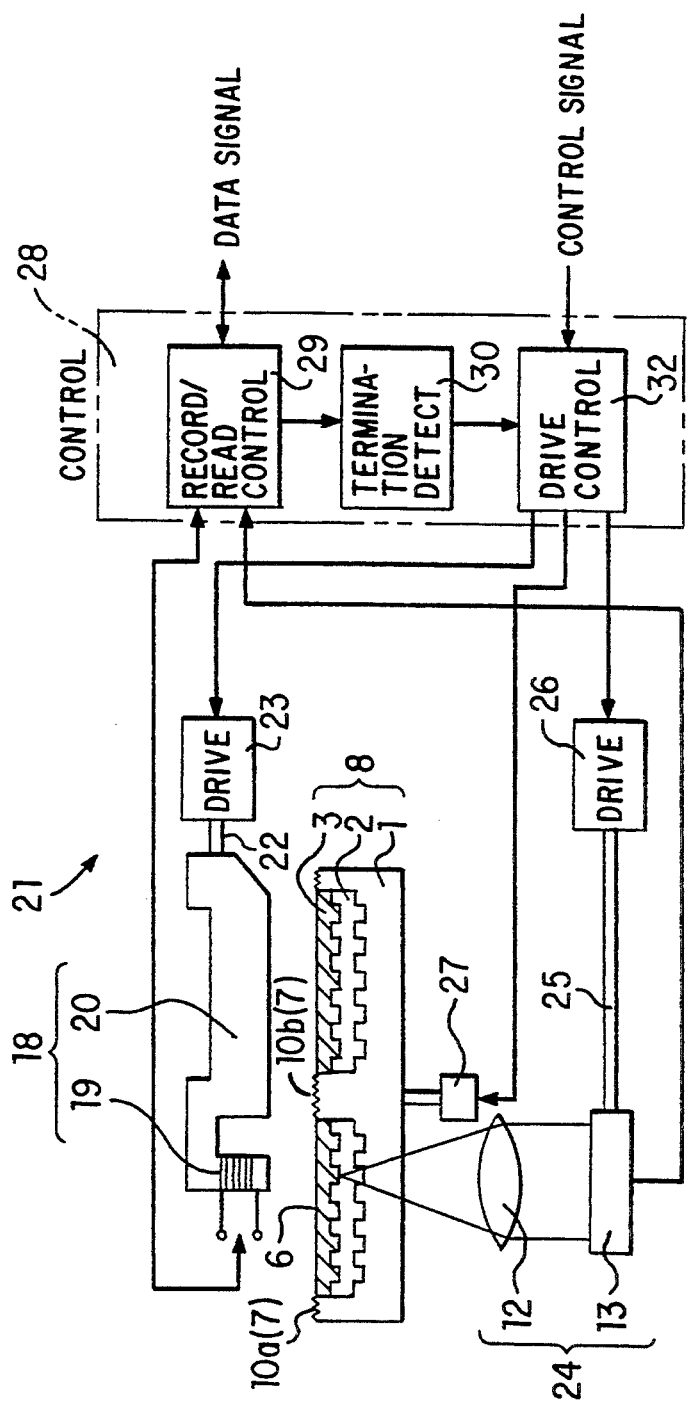
FIG. 2 is a block diagram showing a structure of a magneto-optical record/reproduce apparatus 21 according to an example of the present invention.

The present invention will be described by way of an example. FIGS. 1 through 4E show one example according to the present invention. FIG. 1 is a sectional view showing a magneto-optical record disk 8 in the example according to the present invention. FIG. 2 is a block diagram showing a structure of a magneto-optical record/reproduce apparatus (hereinafter, referred to in short as an apparatus) 21 in the example according to the present invention.

The record disk 8 of this example has a structure as shown in FIG. 1. As seen from FIG. 1, a ring-like recession 4 which extends concentrically with a disk-like glass substrate 1 is formed in the glass substrate 1. In the vicinity of a radially center portion and in the vicinity of a radially rim portion of the glass substrate 1, supporting portions 10a (7) and 10b (7) are formed, respectively. In the supporting portions 10a and 10b, the end faces of the glass substrate 1 in a thick direction are made into rough faces like a frosted glass. The apparatus 21 of this example utilizes a levitated-type magnetic head which is described below. The levitated-type magnetic head is supported by the supporting portions 10a, 10b when the record disk 8 stops, as described below.

At a bottom 5 of the recession 4, a pattern portion 17 having a convex and concave pattern 14 corresponding to predetermined tracking information is formed. On the bottom 5 in the recession 4 of the glass substrate 1, a record layer 2 and a protective layer 3 are successively laminated. Thus, the record disk 8 is constructed. The surface of the record layer 2 of the record disk 8 has a convex and concave pattern for tracking which corresponds to the tracking convex and concave pattern 14 of the pattern portion 17. As a result, a record area 6 on which information is magnetically recorded or from which information is magnetically read as described below is defined. The supporting portions 10a and 10b are defined as non-record areas 7 for which the magnetic recording or reading of information is not performed.

The structure of the apparatus 21 using the record disk 8 is described with reference to FIG. 2. The apparatus 21 of this example utilizes a levitated-type magnetic head (hereinafter, referred to in short as a magnetic head) 18 for the purpose of shorting the access time for accessing the record disk 8. In the apparatus 21 using the magnetic head 18, information can be overwritten by modulating the magnetic field. During the record/read operation of the apparatus 21, the magnetic head 18 is positioned above the record disk 8. The magnetic head 18 can shorten the time required for inverting the magnetic field in the recording/reading of information.

The apparatus 21 of this example includes the magnetic head 18. The magnetic head 18 includes a slider 20 with a magnet coil 19. The slider 20 is coupled to one end of an arm 22. The other end of the arm 22 is coupled to a drive mechanism 23. The drive mechanism 23 reciprocates the magnetic head 18 via the arm 22 in the radial direction of the record disk 8. The drive mechanism 23 is, for example, implemented using a rack-and-pinion type mechanism which uses a DC motor as a power supply, a linear motor device, or a voice coil device.

In the apparatus 21, an optical pickup 24 is provided on the opposite side of the record disk 8, such side being opposite to that which the magnetic head 18 is located. The optical pickup 24 includes a semiconductor laser 13 and a convergent lens 12. The optical pickup 24 is coupled to one end of an arm 25. The other end of the arm 25 is coupled to a drive mechanism 26 having the same structure as that of the drive mechanism 23. The drive mechanism 26 reciprocates the optical pickup 24 in the radial direction of the record disk 8. The record disk 8 is rotated by a drive device 27 such as a motor.

The apparatus 21 includes a control device 28. The control device 28 includes a record/read control section 29, a termination detect section 30 and a drive control section 32. To the record/read control section 29, the magnetic head 18 and the optical pickup 24 are electrically connected. The record/read control section 29 outputs a signal to be recorded to the magnetic head 18 or receives a signal read by the magnetic head 18, or receives a tracking signal read from the record disk 8 by the optical pickup 24. The termination detect section 30 detects the start of the drive device 27 and detects the termination of access related to the record disk 8.

The drive control section 32 is electrically connected to the drive mechanisms 23 and 26 and the drive device 27, respectively, and controls the operations thereof as described below. The record/read control section 29 receives information to be recorded on the record disk 8 from an external control apparatus or the like, and outputs the information read from the record disk 8 to the external control apparatus or the like. The drive control section 32 receives a control signal which specifies the control operation of the drive control section 32 which controls the start of the drive device 27, and the operation of the drive mechanisms 23 and 26 during the recording or reading of information.

Figure 3A:
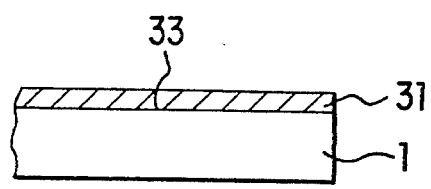
FIGS. 3A and 3B are sectional views illustrating a manufacturing method of the record disk 8 in the example according to the present invention.
Figure 3B:
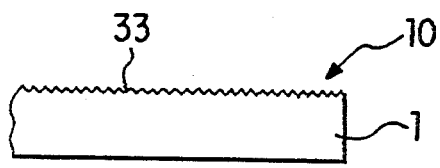

The manufacturing method for the record disk 8 is described with reference to FIGS. 3A through 4E. A radially inner or outer portion or inner and outer portions of a ring-like area to be the record area 6 on the main surface 33 of the glass substrate 1, a mask 31 of a resist is formed in a vacuum, as is shown in FIG. 3A. Then, the glass substrate 1 is taken out of the vacuum. The glass substrate 1 which is covered with the mask 31 is treated so that the surface thereof is roughed by sand blasting or that the surface thereof is roughed by dissolution using hydrofluoric acid. As a result, as is shown in FIG. 3B, the frosted glass supporting portions 10a and 10b are formed which have surface roughness of, for example, several to several hundreds of micrometers, and preferably, of about 30 to 100 μm.

The range of the surface roughness is determined for the following reasons. If the surface roughness is smaller than several micrometers, the friction between the non-record area 7 and the magnetic head 18 becomes large. As a result, when the record disk 8 rotates while the non-record area 7 and the magnetic head 18 are in contact with each other, both of them are damaged. On the other hand, if the surface roughness is larger than several hundreds of micrometers, the magnetic head 18 is ground by the non-record area 7. Therefore, the magnetic head 18 is damaged.

Figure 4A:
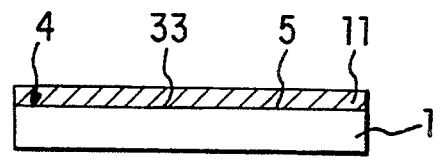

To the portion to be the record area 6 on the main surface 33 of the glass substrate 1, that is, the bottom 5 of the recession 4 of the glass substrate, a positive-type resist 11 is applied to have a thickness of several hundreds of micrometers by spin coating or by using a roll coater, as is shown in FIG. 4A. The positive-type resist 11 has a characteristic that when it is exposed to light in a vacuum, the exposed portion can be removed by developing.

Figures 1, 2, 4B:
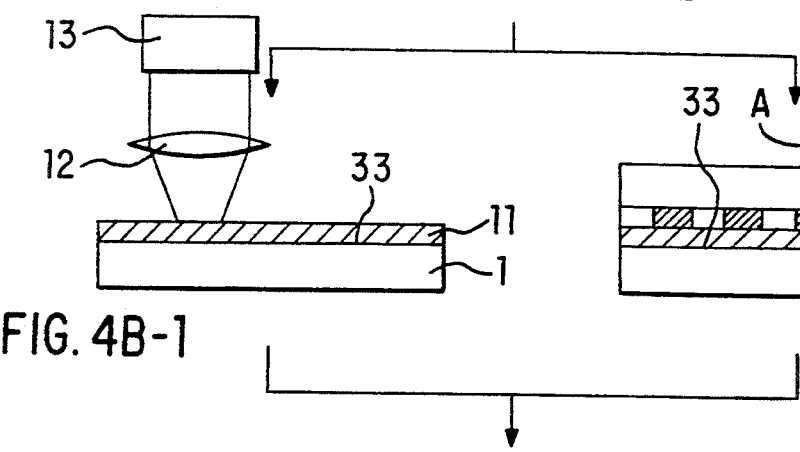

Next, two types of steps can be alternatively performed. The first one is shown in FIG. 4B-1. In this first one, the positive-type resist 11 which is applied on the glass substrate 1 is irradiated with laser light from the semiconductor laser device 13 via the convergent lens 12, so that a desired tracking pattern is drawn. The second one is shown in FIG. 4B-2. In this second one, on the main surface 34 of a transparent glass substrate 15, a pattern 35 corresponding to the tracking pattern 14 is previously formed using chrome (Cr). The main surface 34 of the glass substrate 15 is superimposed on the positive-type resist 11 on the glass substrate 1. The lamination of the glass substrates 1 and 15 is irradiated with laser light from the glass substrate 15 side, as represented by an arrow A.

Figure 4C:
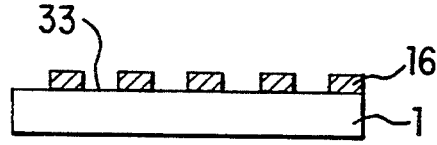

By either one of the above two steps, the glass substrate 1 having a resist 16 with an identical pattern can be obtained. As described above, by developing the positive-type resist 11 on which the tracking pattern is formed as a latent image, the positive-type patterned resist 16 is formed on the glass substrate 1, as is shown in FIG. 4C.

Figure 4D:
Figure 4E:
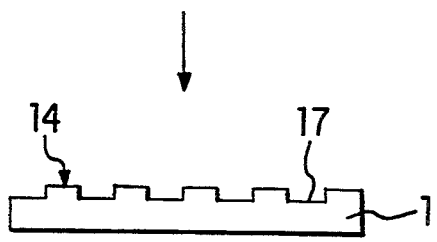

Thereafter, the main surface 33 of the glass substrate 1 is etched using the positive-type resist 16 as a mask by a dry etching method using a gas halide. Accordingly, part of the main surface 33 of the glass substrate 1 which is not covered with the positive-type resist 16 is removed by a prescribed amount, as is shown in FIG. 4D. The positive-type resist 16 is exposed to a plasma of gaseous oxygen, or is immersed in an organic solvent, so that the positive-type resist 16 is removed from the glass substrate 1. As a result, the pattern portion 17 having the tracking convex and concave pattern 14 is formed, as is shown in FIG. 4E.

After forming the pattern portion 17 in the glass substrate 1, for example, an amorphous layer composed of an alloy of a rare-earth element such as Tb, Dy Gd and Nd and a transition metal such as Fe and Co is evaporated on the pattern portion 17 in a vacuum by an electron beam evaporation method, so as to form the record layer 2. On the record layer 2, the protective layer 3 which is made of a epoxy-type resin or an acrylic-type resin is formed by the electron beam evaporation method.

Hereinafter, the operation of the apparatus of this example will be described.

(1) Start of the Record/Reproduce Operation

When an access is not performed with respect to the record disk 8, the record disk 8 stops. At this time, the magnetic head 18 is in contact with either one of the supporting portion 10a or 10b of the record disk 8 by means of the drive mechanism 23. The optical pickup 24, for example, stops at a predetermined stand-by position on the outside of the record disk 8 in the apparatus 21. When a control signal by which the access to the record disk 8 is started is externally input into the control device 28, the drive control section 32 drives the drive device 27 so as to rotate the record disk 8.

At the time when the record disk 8 starts to rotate, the record disk 8 rotates while the magnetic head 18 is in contact with one of the supporting portions 10a and 10b as the non-record area 7. Since the non-record area 7 is like a frosted glass and the friction thereof is lower than the record area 6, the friction between the magnetic head 18 and the record disk 8 can be reduced, and hence the record disk 8 smoothly rotates with respect to the magnetic head 18. By this rotation, an air flow occurs between the record disk 8 and the magnetic head 18. During the rotation of the record disk 8, the magnetic head 18 is levitated by a lift due to the air flow, and the distance between the magnetic head 18 and the record disk 8 is maintained constant.

In the apparatus 21, the distance between the protective layer of the record disk 8 and the magnetic head 18 is 2 to 5 μm, which means that they are positioned extremely close to each other. The distance therebetween is determined for the following reasons. Information is recorded on the record disk 8 in high density, so that the record frequency used for recording information on the record disk 8 is several megahertz. The levitated-type magnetic head 18 is required to invert the magnetic field in a synchronous manner with a record signal having the above record frequency.

The above-mentioned control signal is input into the drive control section 32, the drive control section 32 controls the drive mechanism 23 so as to move the levitated magnetic head 18 to a predetermined position above the record area 6. Also, the drive control section 32 controls the drive mechanism 26 so as to move the optical pickup 24 to a position facing the magnetic head 18 across the record disk 8. Then, an access to the record disk 8 is performed. At this time, the tracking to the record disk 8 is performed based on the tracking signal read from the record disk 8 by the optical pickup 24. The magnetic head 18 operates in a synchronous manner with the operation of the optical pickup 24 by the operation of the drive mechanism 23 under the control of the drive control section 32.

As described above, at the time when the record disk 8 starts to rotate, the record disk 8 rotates while the magnetic head 18 is in contact with the non-record area 7. Since the non-record area 7 is like a frosted glass and the friction thereof is lower than the record area 6, the friction between the magnetic head 18 and the record disk 8 can be reduced. Therefore, the magnetic head 18 and the record disk 8 are prevented from being damaged, and hence the magnetic head 18 is prevented from erroneously operating during the record/read operation. The life time of the magnetic head 18 can be extended. Moreover, the surface of the record disk 8 is prevented from being damaged, noise is prevented from mixing during the record/read operation of information, and the life time of the record disk 8 can be extended.

(2) Termination of the Record/Reproduce Operation

When a control signal for terminating the access to the record disk 8 is externally input into the control device 28, the drive control section 32 controls the drive device 27 so as to stop the rotation of the record disk 8. When the control signal for access termination is input into the record/read control section 29 of the control device 28, the termination detect section 30 detects that the access is terminated. When the termination detect section 30 detects that the access is terminated, the termination detect section 30 outputs a detect signal to the drive control section 32. By this detect signal, the drive control section 32 controls the drive device 27 to stop and controls the drive mechanism 23 so as to move the magnetic head 18 to a position above one of the supporting portions 10a and 10b, i.e., above the non-record area 7 of the record disk 8. One of the supporting portions 10a and 10b is selected, for example, by determining which is closer to the position of the magnetic head 18 in the radial direction at the termination of the access.

When the rotation of the record disk 8 is to be stopped, the lift due to the air flow is eliminated. As a result, the magnetic head 18 goes down to the record disk 8 and comes into contact with the non-record area 7 of the record disk 8. The record disk 8 continues to rotate while the magnetic head 18 is in contact with the non-record area 7, and then stops.

As described above, when the rotation of the record disk 8 is to be stopped, the magnetic head 18 is prevented from coming into contact with the record area 6 of the record disk 8 which continues to rotate. Therefore, the magnetic head 18 and the record disk 8 are prevented from being damaged. The record disk 8 continues to rotate while the magnetic head 18 is in contact with the non-record area 7. At this time, since the non-record area 7 is like a frosted glass and has a lower friction than that of the record area 6, the friction between the magnetic head 18 and the record disk 8 can be reduced as compared with the conventional case. Therefore, the magnetic head 18 and the record disk 8 are prevented from being damaged, and hence the magnetic head 18 is prevented from erroneously operating during the record/read operation. The life time of the record disk 8 and the life time of the magnetic head 18 can be extended.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical record/reproduce apparatus using a magneto-optical record medium having a surface on which a record area and a non-record area are defined, the non-record area having a lower friction than that of the record area, the apparatus comprising:

record/read means disposed in the vicinity of the surface of the magneto-optical record medium, the record/read means being moved away from the magneto-optical record medium during a running state of the magneto-optical record medium for recording or reading information, the record/read means being in contact with the magneto-optical record medium during a stop state of the magneto-optical record medium after terminating the recording or reading of the information;

termination detect means for detecting a termination of the record/read of the information related to the magneto-optical record medium, and for outputting a termination detect signal; and move means for moving the record/read means to a position facing the non-record area based on the termination detect signal from the termination detect means.

2. A magneto-optical record/reproduce apparatus according to claim 1 wherein the record/read means is positioned above the magneto-optical record medium.

3. A magneto-optical record/reproduce apparatus according to claim 1 wherein the record/read means is in contact with the non-record area and runs in a relative manner with respect to the magneto-optical record medium period from the stop state to the running state of the magneto-optical record medium.

* * * * *

UNITED STATES PATENT AND TRADEMARK OFFICE
CERTIFICATE OF CORRECTION

PATENT NO. : 5,416,754
DATED : May 16, 1995
INVENTOR(S) : J. Washo

It is certified that error appears in the above-indentified patent and that said Letters Patent is hereby corrected as shown below:

In column 8, line 64, "period" should read -- in a transition period --.

Signed and Sealed this

Fifth Day of September, 1995

Attest:

BRUCE LEHMAN

Attesting Officer     Commissioner of Patents and Trademarks